US010375390B2

(12) United States Patent
Oh et al.

(10) Patent No.: US 10,375,390 B2
(45) Date of Patent: Aug. 6, 2019

(54) METHOD AND APPARATUS OF DERIVING INTRA PREDICTION MODE USING MOST PROBABLE MODE GROUP

(71) Applicant: INFOBRIDGE PTE. LTD., Singapore (SG)

(72) Inventors: Soo Mi Oh, Seongnam-si (KR); Moonock Yang, Singapore (SG)

(73) Assignee: INFOBRIDGE PTE. LTD., Singapore (SG)

( * ) Notice: Subject to any disclaimer, the term of this patent is extended or adjusted under 35 U.S.C. 154(b) by 131 days.

(21) Appl. No.: 15/332,325

(22) Filed: Oct. 24, 2016

(65) Prior Publication Data

US 2017/0041602 A1 Feb. 9, 2017

Related U.S. Application Data

(63) Continuation of application No. 14/996,380, filed on Jan. 15, 2016, now Pat. No. 9,503,730, which is a
(Continued)

(30) Foreign Application Priority Data

Nov. 4, 2011 (KR) .......................... 10-2011-0114606

(51) Int. Cl.
*H04N 19/11* (2014.01)
*H04N 19/176* (2014.01)
(Continued)

(52) U.S. Cl.
CPC ........... *H04N 19/11* (2014.11); *H04N 19/103* (2014.11); *H04N 19/117* (2014.11);
(Continued)

(58) Field of Classification Search
CPC ...... H04N 19/11; H04N 19/46; H04N 19/625; H04N 19/124; H04N 19/61; H04N 19/122;
(Continued)

(56) References Cited

U.S. PATENT DOCUMENTS 5,550,640 A * 8/1996 Tsuboi ................ H04N 5/9264
360/32
8,422,810 B2 * 4/2013 Choi ...................... H04N 19/70
375/240.03
(Continued)

FOREIGN PATENT DOCUMENTS

CN 1585495 A 2/2005
TW 201110708 A1 3/2011
(Continued)

OTHER PUBLICATIONS

Auyeung et al, "Intra Coding with Directional DCT and Directional DWT," JCTVC-B107, Joint Collaborative Team on Video Coding (JCT-VC) of ITU-T SG16 WP3 and ISO/IEC JTC1/SC29/WG11, 2nd Meeting: Geneva, CH, Jul. 21-28, 2010, pp. 1-28.
(Continued)

*Primary Examiner* — Joseph Suh
(74) *Attorney, Agent, or Firm* — Birch, Stewart, Kolasch & Birch, LLP (57) ABSTRACT

An image encoding apparatus is presented. A differential quantization parameter is generated by subtracting a quantization parameter predictor from a quantization parameter, and is entropy-coded. If two or more quantization parameters are available among a left quantization parameter, an above quantization parameter and a previous quantization parameter of a current coding unit, the quantization parameter predictor is generated using two available quantization parameters determined according a predetermined order, and if only one quantization parameter is available, the
(Continued)

available quantization parameter is set as the quantization parameter predictor. A transform type for inversely transforming the residual signals is selected among a discrete cosine transform (DCT)-based integer transform and a discrete sign transform (DST)-based integer transform based on a prediction mode and a size of a transform unit.

9 Claims, 7 Drawing Sheets

Related U.S. Application Data continuation of application No. 14/569,752, filed on Dec. 14, 2014, now Pat. No. 9,270,997, which is a continuation of application No. 14/349,985, filed as application No. PCT/CN2012/083972 on Nov. 2, 2012, now Pat. No. 8,948,259.

(51) Int. Cl.
| | | |
|---|---|---|
| H04N 19/117 | (2014.01) | |
| H04N 19/91 | (2014.01) | |
| H04N 19/157 | (2014.01) | |
| H04N 19/86 | (2014.01) | |
| H04N 19/103 | (2014.01) | |
| H04N 19/593 | (2014.01) | |
| H04N 19/159 | (2014.01) | |
| H04N 19/129 | (2014.01) | |
| H04N 19/463 | (2014.01) | |
| H04N 19/44 | (2014.01) | |
| H04N 19/122 | (2014.01) | |
| H04N 19/124 | (2014.01) | |
| H04N 19/46 | (2014.01) | |
| H04N 19/61 | (2014.01) | |
| H04N 19/625 | (2014.01) | |
| H04N 19/172 | (2014.01) | |

(52) U.S. Cl.
CPC ......... *H04N 19/122* (2014.11); *H04N 19/124* (2014.11); *H04N 19/129* (2014.11); *H04N 19/157* (2014.11); *H04N 19/159* (2014.11); *H04N 19/176* (2014.11); *H04N 19/44* (2014.11); *H04N 19/46* (2014.11); *H04N 19/463* (2014.11); *H04N 19/593* (2014.11); *H04N 19/61* (2014.11); *H04N 19/625* (2014.11); *H04N 19/86* (2014.11); *H04N 19/91* (2014.11); *H04N 19/172* (2014.11)

(58) Field of Classification Search
CPC .... H04N 19/44; H04N 19/463; H04N 19/129; H04N 19/159; H04N 19/103; H04N 19/593; H04N 19/86; H04N 19/117; H04N 19/91; H04N 19/176; H04N 19/157; H04N 19/172
See application file for complete search history.

(56) References Cited

U.S. PATENT DOCUMENTS

| | | | | |
|---|---|---|---|---|
| 8,902,978 B2* | 12/2014 | Lim | ............... | H04N 19/182 375/240.12 |
| 2003/0223495 A1* | 12/2003 | Sun | ............... | H04N 19/197 375/240.12 |
| 2004/0264576 A1* | 12/2004 | Woods | ............ | H04N 19/63 375/240.24 |
| 2005/0117646 A1* | 6/2005 | Joch | ............... | H04N 19/51 375/240.16 |
| 2005/0123207 A1* | 6/2005 | Marpe | ............ | H04N 19/196 382/239 |
| 2005/0157797 A1 | 7/2005 | Gaedke | | |
| 2007/0092002 A1* | 4/2007 | Xue | ............... | H04N 19/44 375/240.03 |
| 2007/0223021 A1 | 9/2007 | Song | | |
| 2009/0141798 A1* | 6/2009 | Adachi | ............ | H04N 19/136 375/240.12 |
| 2009/0175331 A1* | 7/2009 | Karczewicz | ......... | H04N 19/176 375/240.03 |
| 2009/0296808 A1* | 12/2009 | Regunathan | ......... | H04N 19/197 375/240.03 |
| 2009/0310678 A1* | 12/2009 | Tanaka | ............ | H04N 19/593 375/240.15 |
| 2010/0053300 A1* | 3/2010 | Einarsson | ............ | H04L 65/80 348/14.01 |
| 2010/0135389 A1* | 6/2010 | Tanizawa | ............ | H04N 19/159 375/240.12 |
| 2010/0208802 A1* | 8/2010 | Tsukuba | ............ | H04N 19/159 375/240.12 |
| 2011/0110421 A1* | 5/2011 | Seok | ............... | H04N 19/176 375/240.03 |
| 2011/0243229 A1 | 10/2011 | Kim et al. | | |
| 2011/0274162 A1* | 11/2011 | Zhou | ............... | H04N 19/176 375/240.03 |
| 2011/0292994 A1 | 12/2011 | Lim et al. | | |
| 2011/0292999 A1* | 12/2011 | Jeong | ............ | H04N 19/00024 375/240.12 |
| 2011/0317757 A1* | 12/2011 | Coban | ............ | H04N 19/197 375/240.02 |
| 2012/0020579 A1 | 1/2012 | Choi et al. | | |
| 2012/0020580 A1 | 1/2012 | Sasai et al. | | |
| 2012/0027084 A1 | 2/2012 | Zhang et al. | | |
| 2012/0057630 A1* | 3/2012 | Saxena | ............ | H04N 19/105 375/240.03 |
| 2012/0082223 A1* | 4/2012 | Karczewicz | ......... | H04N 19/196 375/240.12 |
| 2012/0163455 A1* | 6/2012 | Zheng | ............ | H04N 19/176 375/240.13 |
| 2012/0177112 A1 | 7/2012 | Guo et al. | | |
| 2012/0177113 A1 | 7/2012 | Guo et al. | | |
| 2012/0224777 A1 | 9/2012 | Kim et al. | | |
| 2012/0230403 A1 | 9/2012 | Liu et al. | | |
| 2012/0250758 A1* | 10/2012 | Jou | ............... | H04N 19/00121 375/240.03 |
| 2012/0314766 A1 | 12/2012 | Chien et al. | | |
| 2013/0077871 A1* | 3/2013 | Lu | ............... | G06K 9/36 382/197 |
| 2013/0083845 A1* | 4/2013 | Yu | ............... | H04N 19/197 375/240.03 |
| 2013/0114707 A1 | 5/2013 | Seregin et al. | | |
| 2013/0266064 A1 | 10/2013 | Zhang et al. | | |

FOREIGN PATENT DOCUMENTS

| | | | |
|---|---|---|---|
| TW | 201132132 A1 | 9/2011 | |
| WO | WO 2010/039000 A2 | 4/2010 | |
| WO | WO 2011/021844 A2 | 2/2011 | |
| WO | WO 2012/170812 A1 | 12/2012 | |
| WO | WO 2013/037489 A1 | 3/2013 | |
| WO | WO 2013/039676 A1 | 3/2013 | |
| WO | WO 2013/051903 A1 | 4/2013 | |
| WO | WO 2013/064095 A1 | 5/2013 | |
| WO | WO 2013/064098 A1 | 5/2013 | |
| WO | WO 2013/064099 A1 | 5/2013 | |
| WO | WO 2013/064100 A1 | 5/2013 | |

OTHER PUBLICATIONS

Sato, "CE4: Result of Combination 2.3.g + 2.3.e," JCTVC-F648, Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-4.

Zhang et al., "Method for deriving Chroma QP from Luma QP," JCTVC-F277, Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-6.

(56) References Cited

OTHER PUBLICATIONS

Zou et al., "Planar Mode Binarization for Intra Mode Coding", Joint Collaborative Team on Video Coding (JCT-VC) of ITU-T SG16 WP3 and ISO/IEC JTC1/SC29/WG11, Document: JCTVC-F190, 6th Meeting: Torino, IT, Jul. 14-22, 2011, 3 pages.

Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting, San José, CA, USA, Feb. 1-10, 2012 (Feb. 10, 2012), JCTVC-H1003, pp. 1-249 (259 pages total).

Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11, N12186, 6th Meeting, Torino, IT, Jul. 14-22, 2011 (Oct. 2, 2011), JCTVC-F803 d6, pp. 1-216 (230 pages total).

Chen, "BoG report on intra mode coding with fixed number of MPM candidates," Joint Collaborative Team on Video Coding (JCT-VC) of ITU-T SG16 WP3 and ISO/IEC JTC1/SC29/WG11, 6th Meeting, Torino, Jul. 14-22, 2011 (Jul. 20, 2011), JCTVC-F765, pp. 1-3.

Chien et al., "Parsing friendly intra mode coding," Joint Collaborative Team on Video Coding (JCT-VC) of ITU-T SG16 WP3 and ISO/IEC JTC1/SC29/WG11, 6th Meeting, Torino, IT, Jul. 14-22, 2011 (Jul. 2, 2011), JCTVC-F459, pp. 1-5.

International Search Report, issued in PCT/CN2012/083972, dated Nov. 2, 2012.

Toru Kumakura et al., "Fixing the number of mpm candidates", Joint Collaborative Team on Video Coding (JCT-VC) of ITU-T SC16 WP3 and ISO/IEC JTC1/SC29/WG11 6th Meeting, Jul. 14-22, 2011, pp. 2-9, JCTVC-F340.

Toru Kumakura et al., "Intra prediction mode coding based on direction difference", Joint Collaborative Team on Video Coding (JCT-VC) of ITU-T SC16 WP3 and ISO/IEC JTC1/SC29/WG11 6th Meeting, Jul. 14-22, 2011, pp. 2-14, JCTVC-F339.

Tzu-Der Chuang et al. "Luma Intra Prediction Mode Coding", Joint Collaborative Team on Video Coding(JCT-VC) of ITU-T SC16 WP3 and ISO/IEC JTC1/SC29/WG11 6th Meeting, Jul. 14-22, 2011, pp. 2-6, JCTVC-F062.

Wiegand et al., "WD3: Working Draft 3 of High-Efficiency Video Coding," Joint Collaborative Team on Video Coding (JCT-VC) of ITU-T SG16 WP3 and ISO/IEC JTC1/SC29/WG11, 5th Meeting, Geneva, CH, Mar. 16-23, 2011 (Mar. 30, 2011), JCTVC-E603, 217 pages total.

\* cited by examiner

METHOD AND APPARATUS OF DERIVING INTRA PREDICTION MODE USING MOST PROBABLE MODE GROUP

CROSS-REFERENCE TO RELATED APPLICATIONS

This Application is a Continuation of U.S. patent application Ser. No. 14/996,380 filed on Jan. 15, 2016 (now U.S. Pat. No. 9,503,730 issued Nov. 22, 2016), which is a Continuation of U.S. patent application Ser. No. 14/569,752 filed on Dec. 14, 2014 (now U.S. Pat. No. 9,270,997 issued on Feb. 23, 2016), which is a Continuation of U.S. patent application Ser. No. 14/349,985 filed on Apr. 4, 2014 (now U.S. Pat. No. 8,948,259 issued on Feb. 3, 2015), which is filed as the National Phase of PCT/CN2012/083972 filed on Nov. 2, 2012, which claims the benefit under 35 U.S.C. § 119(a) to Korean Patent Application No. 10-2011-0114606 filed on Nov. 4, 2011, all of which are hereby expressly incorporated by reference into the present application.

BACKGROUND OF THE INVENTION

The present invention relates to a method and an apparatus of deriving an intra prediction mode, and more particularly, to a method of constructing an MPM group using neighboring intra prediction modes and deriving the intra prediction mode using the MPM group and intra prediction information.

In image compression methods such as MPEG-1, MPEG-2, MPEG-4 and H.264/MPEG-4 AVC, one picture is divided into macroblocks to encode an image. Then, the respective macroblocks are encoded using inter prediction or intra prediction.

In intra prediction, a current block of the picture is encoded not using a reference picture, but using values of reconstructed pixels spatially adjacent to the current block. An optimal prediction mode with little distortion is selected out of a plurality of intra prediction modes by comparing a prediction block generated using the adjacent pixel values with an original block. Then, using the selected intra prediction mode and the adjacent pixel values, prediction values of the current block are calculated. Differences between the prediction values and pixels values of the original current block are calculated and then encoded through transform coding, quantization and entropy coding. The intra prediction mode is also encoded.

According to H.264 standard, there are nine modes in 4×4 intra prediction. The nine modes are a vertical mode, a horizontal mode, a DC mode, a diagonal down-left mode, a diagonal down-right mode, a vertical right mode, a vertical left mode, a horizontal-up mode and a horizontal-down mode. One mode is selected among the nine modes to generate a prediction block of the current block, the mode information is transmitted to the decoder.

In HEVC standard under development, the number of intra prediction modes increases to 18 or 35, the size of coding unit lies between 8×8 and 128×128. The coding unit has similar purpose to the macroblock of H.264/AVC.

Accordingly, if the intra prediction mode is encoded using the same method of H.264/AVC, the coding efficiency deteriorates because the number of intra prediction modes is greater than that of H.264/AVC. Also, as the size of the coding unit increases and the number of intra prediction modes increases, quantization method and scanning method should be modified to enhance the coding efficiency.

SUMMARY OF THE INVENTION

The present invention is directed to a method and apparatus of constructing an MPM group using neighboring intra prediction modes and deriving the intra prediction mode using the MPM group and intra prediction information.

One aspect of the present invention provides a method of deriving an intra prediction mode of a current prediction unit, comprising: entropy-decoding a mode group indicator and a prediction mode index, constructing an MPM group including three intra prediction modes, determining whether the mode group indicator indicates the MPM group or not, determining an intra prediction mode of the MPM group specified by the prediction mode index as the intra prediction mode of the current prediction unit if the mode group indicator indicates the MPM group, and deriving the intra prediction mode of the current prediction unit using the prediction mode index and the three prediction modes of the MPM group if the mode group indicator does not indicate the MPM group.

A method according to the present invention constructs an MPM group including three intra prediction modes, determines the intra prediction mode of the MPM group specified by the prediction mode index as the intra prediction mode of the current prediction unit if the mode group indicator indicates the MPM group, and derives the intra prediction mode of the current prediction unit using the prediction mode index and the three prediction modes of the MPM group if the mode group indicator does not indicate the MPM group. Therefore, coding efficiency of intra prediction mode is improved by encoding the intra prediction mode of the current block using a plurality of most probable candidates. Also, coding efficiency of intra prediction mode is improved by generating the prediction block very similar to an original block and by minimizing the amount of bits required to encode the residual block.

DETAILED DESCRIPTION OF THE EMBODIMENTS

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

Figure 1:
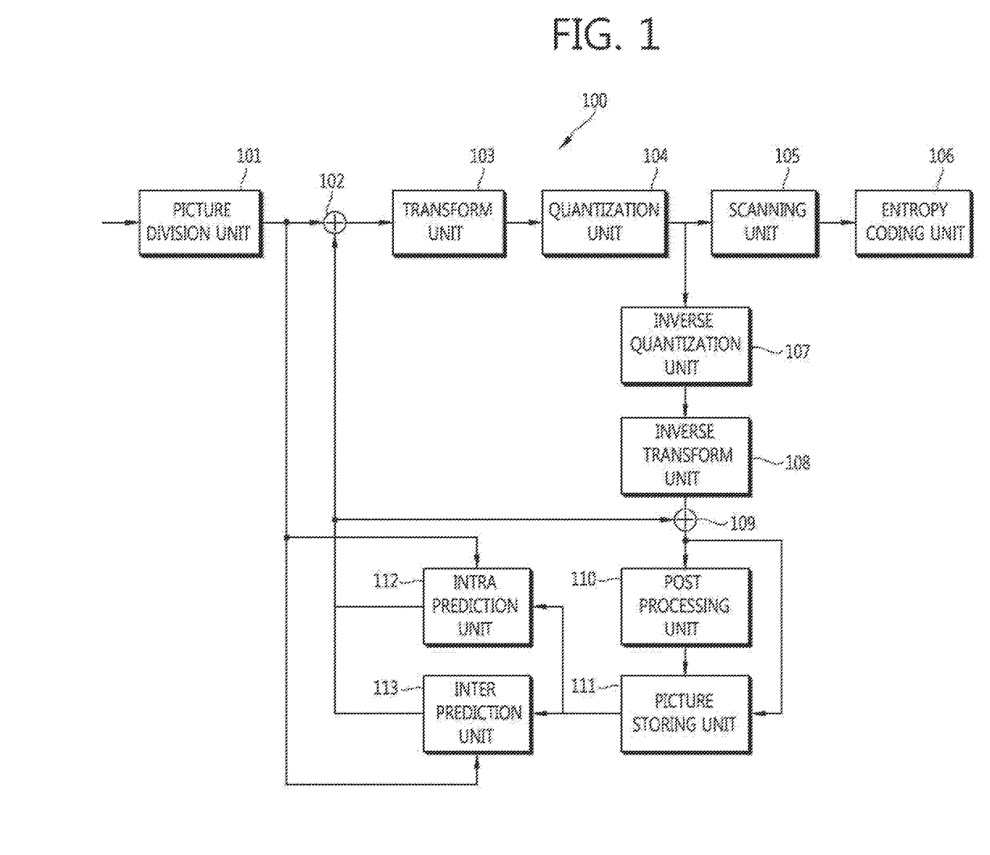
FIG. 1 is a block diagram of an image coding apparatus according to the present invention.

FIG. 1 is a block diagram of an image coding apparatus 100 according to the present invention.

Referring to FIG. 1, the image coding apparatus 100 according to the present invention includes a picture division unit 101, a transform unit 103, a quantization unit 104, a scanning unit 105, an entropy coding unit 106, an inverse quantization unit 107, an inverse transform unit 108, a post-processing unit 110, a picture storing unit 111, an intra prediction unit 112, an inter prediction unit 113, a subtracter 102 and an adder 109.

The picture division unit 101 divides a picture or a slice into a plurality of largest coding units (LCUs), and divides each LCU into one or more coding units. The picture division unit 101 determines prediction mode of each coding unit and a size of prediction unit and a size of transform unit.

An LCU includes one or more coding units. The LCU has a recursive quad tree structure to specify a division structure. Information specifying the maximum size and the minimum size of the coding unit is included in a sequence parameter set. The division structure is specified by one or more split coding unit flags (split_cu_flags). The coding unit has a size of 2N×2N.

A coding unit includes one or more prediction units. In intra prediction, the size of the prediction unit is 2N×2N or N×N. In inter prediction, the size of the prediction unit is 2N×2N, 2N×N, N×2N or N×N. When the prediction unit is an asymmetric partition in inter prediction, the size of the prediction unit may also be one of hN×2N, (2−h)N×2N, 2N×hN and 2N×(2−h)N. The value of h is ½.

A coding unit includes one or more transform units. The transform unit has a recursive quad tree structure to specify a division structure. The division structure is specified by one or more split transform unit flags (split_tu_flags). Information specifying the maximum size and the minimum size of the transform unit is included in a sequence parameter set.

The intra prediction unit 112 determines an intra prediction mode of a current prediction unit and generates one or more prediction blocks using the intra prediction mode. The prediction block has the same size of the transform unit. The intra prediction unit 112 generates reference pixels if there are unavailable reference pixels of a current block, filters adaptively the reference pixels of the current block according to the size of the current block and the intra prediction mode, and generates a prediction block of the current block. The current block has the same size of the prediction block.

Figure 2:
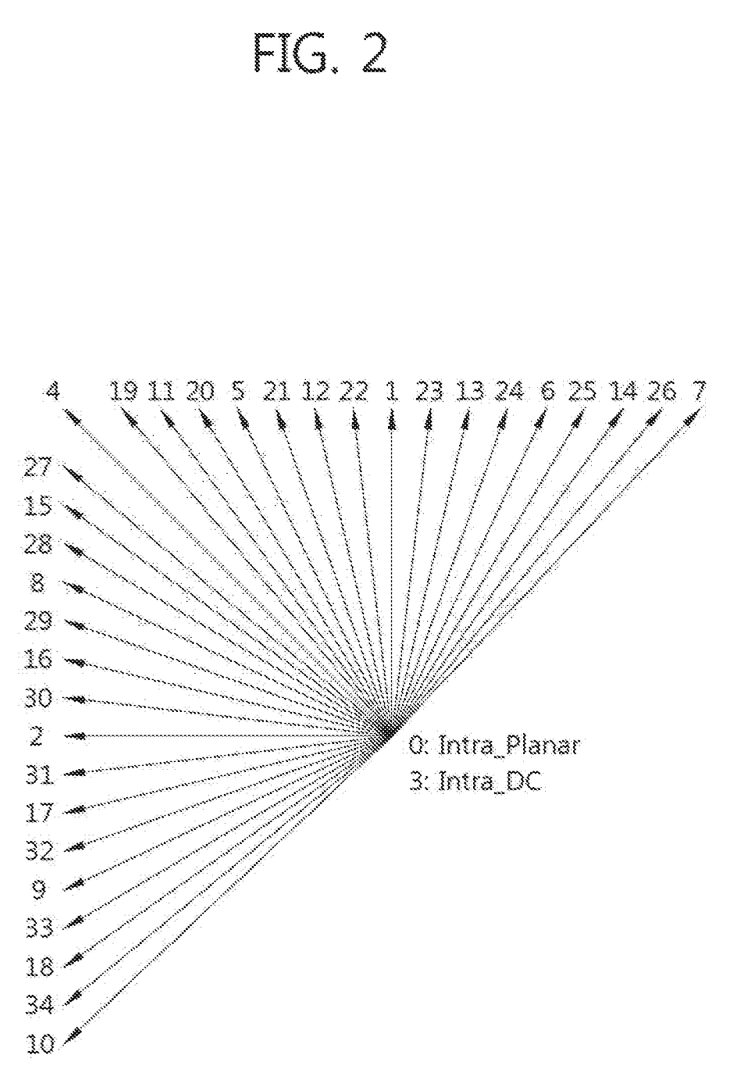
FIG. 2 is a conceptual diagram illustrating intra prediction modes according to the present invention.

FIG. 2 is a conceptual diagram illustrating intra prediction modes according to the present invention. As shown in FIG. 2, the number of intra prediction modes is 35. The DC mode and the planar mode are non-directional intra prediction modes and the others are directional intra prediction modes.

The inter prediction unit 113 determines motion information of the current prediction unit using one or more reference pictures stored in the picture storing unit 111, and generates a prediction block of the prediction unit. The motion information includes one or more reference picture indexes indicating the reference pictures and one or more motion vectors.

The transform unit 103 transforms residual signals generated using an original block and a prediction block to generate a transformed block. The residual signals are transformed in transform units. A transform type is determined by the prediction mode and the size of the transform unit. The transform type is a discrete cosine transform (DCT)-based integer transform or a discrete sign transform (DST)-based integer transform.

The quantization unit 104 determines a quantization parameter for quantizing the transformed block. The quantization parameter is a quantization step size. The quantization parameter is determined per quantization unit having a size equal to or larger than a reference size. A quantization unit of the reference size is referred to as a minimum quantization unit. If the size of the coding unit is equal to or larger than the reference size, the coding unit becomes the quantization unit. A plurality of coding unit may be included in the minimum quantization unit. The reference size is one of allowable sizes of the coding unit. The reference size is determined per a picture and included in the picture parameter set.

The quantization unit 104 generates a quantization parameter predictor and generates a differential quantization parameter by subtracting the quantization parameter predictor from the quantization parameter. The differential quantization parameter is encoded and transmitted to the decoder. If there are no residual signals to be transmitted in the coding unit, the differential quantization parameter of the coding unit may not be transmitted.

The quantization parameter predictor is generated by using quantization parameters of neighboring coding units and/or a quantization parameter of previous coding unit.

The quantization unit 104 sequentially retrieves a left quantization parameter, an above quantization parameter and a previous quantization parameter in this order. An average of the first two available quantization parameters retrieved in that order is set as the quantization parameter predictor when at least two quantization parameters are available. When only one quantization parameter is available, the available quantization parameter is set as the quantization parameter predictor. The left quantization parameter is a quantization parameter of the left neighboring coding unit. The above quantization parameter is a quantization parameter of the above neighboring coding unit. The previous quantization parameter is a quantization parameter of a previous coding unit in coding order.

The quantization unit 104 quantizes the transformed block using a quantization matrix and the quantization parameter to generate a quantized block. The quantized block is provided to the inverse quantization unit 107 and the scanning unit 105.

The scanning unit 105 determines a scan pattern and applies the scan pattern to the quantized block. When CABAC (Context adaptive binary arithmetic coding) is used for entropy coding, the scan pattern is determined as follows.

In intra prediction, the scan pattern is determined by the intra prediction mode and the size of the transform unit. The scan pattern is selected among a diagonal scan, a vertical scan and a horizontal scan. The quantized transform coefficients of the quantized block are divided into significant coefficients, sign flags and levels. The scan pattern is applied to the significant coefficients, sign flags and levels respectively.

When the size of the transform unit is equal to or smaller than a first size, the horizontal scan is selected for the vertical mode and a predetermined number of neighboring intra prediction modes of the vertical mode, the vertical scan is selected for the horizontal mode and the predetermined number of neighboring intra prediction modes of the horizontal mode, and the diagonal scan is selected for the other intra prediction modes. The first size is 8×8.

When the size of the transform unit is larger than the first size, the diagonal scan is selected for all intra prediction modes.

In inter prediction, a predetermined scan pattern is used. The predetermined scan pattern is the diagonal scan.

When the size of the transform unit is larger than a second size, the quantized block is divided into a plurality of subsets and scanned. The second size is 4×4. The scan pattern for scanning the subsets is the same as the scan pattern for scanning quantized transform coefficients of each subset. The quantized transform coefficients of each subset are scanned in the reverse direction. The subsets are also scanned in the reverse direction.

Last non-zero position is encoded and transmitted to the decoder. The last non-zero position specifies position of last non-zero quantized transform coefficient within the transform unit.

Non-zero subset flags are determined and encoded. The non-zero subset flag indicates whether the subset contains non-zero coefficients or not. The non-zero subset flag is not defined for a subset covering a DC coefficient and a subset covering last non-zero coefficient.

The inverse quantization unit 107 inversely quantizes the quantized transform coefficients of the quantized block.

The inverse transform unit 108 inversely transforms the inverse quantized block to generate residual signals of the spatial domain.

The adder 109 generates a reconstructed block by adding the residual block and the prediction block.

The post-processing unit 110 performs a deblocking filtering process for removing blocking artifact generated in a reconstructed picture.

The picture storing unit 111 receives post-processed image from the post-processing unit 110, and stores the image in picture units. A picture may be a frame or a field.

The entropy coding unit 106 entropy-codes the one-dimensional coefficient information received from the scanning unit 105, intra prediction information received from the intra prediction unit 112, motion information received from the inter prediction unit 113, and so on.

Figure 3:
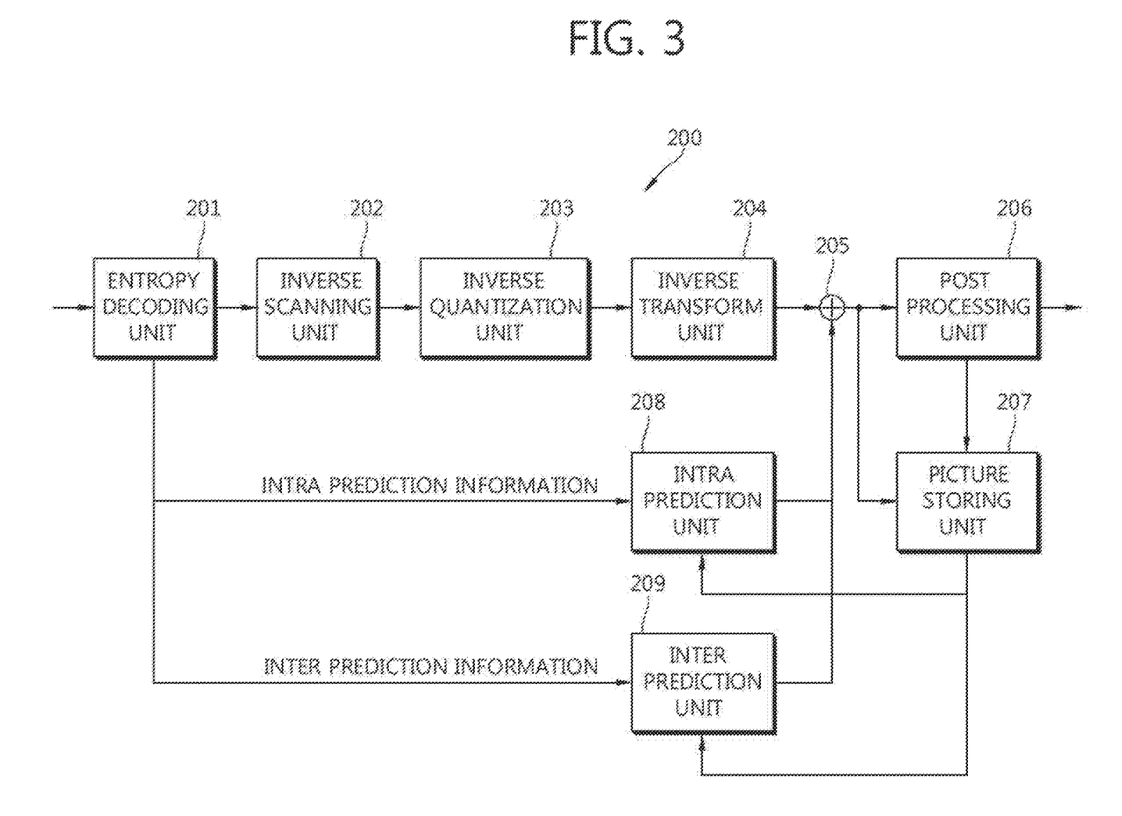
FIG. 3 is a block diagram of an image decoding apparatus according to the present invention.

FIG. 3 is a block diagram of an image decoding apparatus 200 according to the present invention.

The image decoding apparatus 200 according to the present invention includes an entropy decoding unit 201, an inverse scanning unit 202, an inverse quantization unit 203, an inverse transform unit 204, an adder 205, a post processing unit 206, a picture storing unit 207, an intra prediction unit 208 and an inter prediction unit 209.

The entropy decoding unit 201 extracts the intra prediction information, the inter prediction information and the one-dimensional coefficient information from a received bit stream. The entropy decoding unit 201 transmits the inter prediction information to the inter prediction unit 209, the intra prediction information to the intra prediction unit 208 and the coefficient information to the inverse scanning unit 202.

The inverse scanning unit 202 uses an inverse scan pattern to generate two dimensional quantized block. It is supposed that CABAC is used as entropy coding method. The inverse scan pattern is one of the diagonal scan, the vertical scan and the horizontal scan.

In intra prediction, the inverse scan pattern is determined by the intra prediction mode and the size of the transform unit. The inverse scan pattern is selected among the diagonal scan, the vertical scan and the horizontal scan. The selected inverse scan pattern is applied to the significant coefficients, the sign flags and the levels respectively generate the quantized block.

When the size of the transform unit is equal to or smaller than the first size, the horizontal scan is selected for the vertical mode and a predetermined number of neighboring intra prediction modes of the vertical mode, the vertical scan is selected for the horizontal mode and the predetermined number of neighboring intra prediction modes of the horizontal mode, and the diagonal scan is selected for the other intra prediction modes. The first size is 8×8.

When the size of the transform unit is larger than the first size, the diagonal scan is selected for all intra prediction modes.

In inter prediction, the diagonal scan is used.

When the size of the transform unit is larger than the second size, the significant coefficients, the sign flags and the levels are inversely scanned in the unit of the subset to generate subsets. And the subsets are inversely scanned to generate the quantized block. The second size is 4×4.

The inverse scan pattern used for generating each subset is the same as the inverse scan pattern used for generating the quantized block. The significant coefficients, the sign flags and the levels are scanned in the reverse direction. The subsets are also scanned in the reverse direction.

The last non-zero position and the non-zero subset flags are received from the encoder. The last non-zero position is used to determine the number of subsets to be generated. The non-zero subset flags are used to determine the subsets to be generated by applying the inverse scan pattern. The subset covering the DC coefficient and the subset covering the last non-zero coefficient are generated using the inverse scan pattern because the non-zero subset flags for a subset covering a DC coefficient and a subset covering last non-zero coefficient are not transmitted.

The inverse quantization unit 203 receives the differential quantization parameter from the entropy decoding unit 201 and generates the quantization parameter predictor. The quantization parameter predictor is generated through the same operation of the quantization unit 104 of FIG. 1. Then, the inverse quantization unit 203 adds the differential quantization parameter and the quantization parameter predictor to generate the quantization parameter of the current coding unit. If the current coding unit is equal to or larger than the minimum quantization unit and the differential quantization parameter for the current coding unit is not received from the encoder, the differential quantization parameter is set to 0.

The inverse quantization unit 203 inversely quantizes the quantized block.

The inverse transform unit 204 inversely transforms the inversely quantized block to restore a residual block. The inverse transform type is adaptively determined according to the prediction mode and the size of the transform unit. The inverse transform type is the DCT-based integer transform or the DST-based integer transform.

The intra prediction unit 208 restores the intra prediction mode of the current prediction unit using the received intra prediction information, and generates a prediction block according to the restored intra prediction mode. The prediction block has the same size of the transform unit. The intra prediction unit 250 generates reference pixels if there are unavailable reference pixels of the current block, and filters adaptively the reference pixels of the current block according to the size of the current block and the intra prediction mode. The current block has the same size of the transform unit.

The inter prediction unit 209 restores the motion information of the current prediction unit using the received inter prediction information, and generates a prediction block using the motion information.

The post-processing unit 206 operates the same as the post-processing unit 110 of FIG. 1.

The picture storing unit 207 receives post-processed image from the post-processing unit 206, and stores the image in picture units. A picture may be a frame or a field.

The adder 205 adds the restored residual block and a prediction block to generate a reconstructed block.

Figure 4:
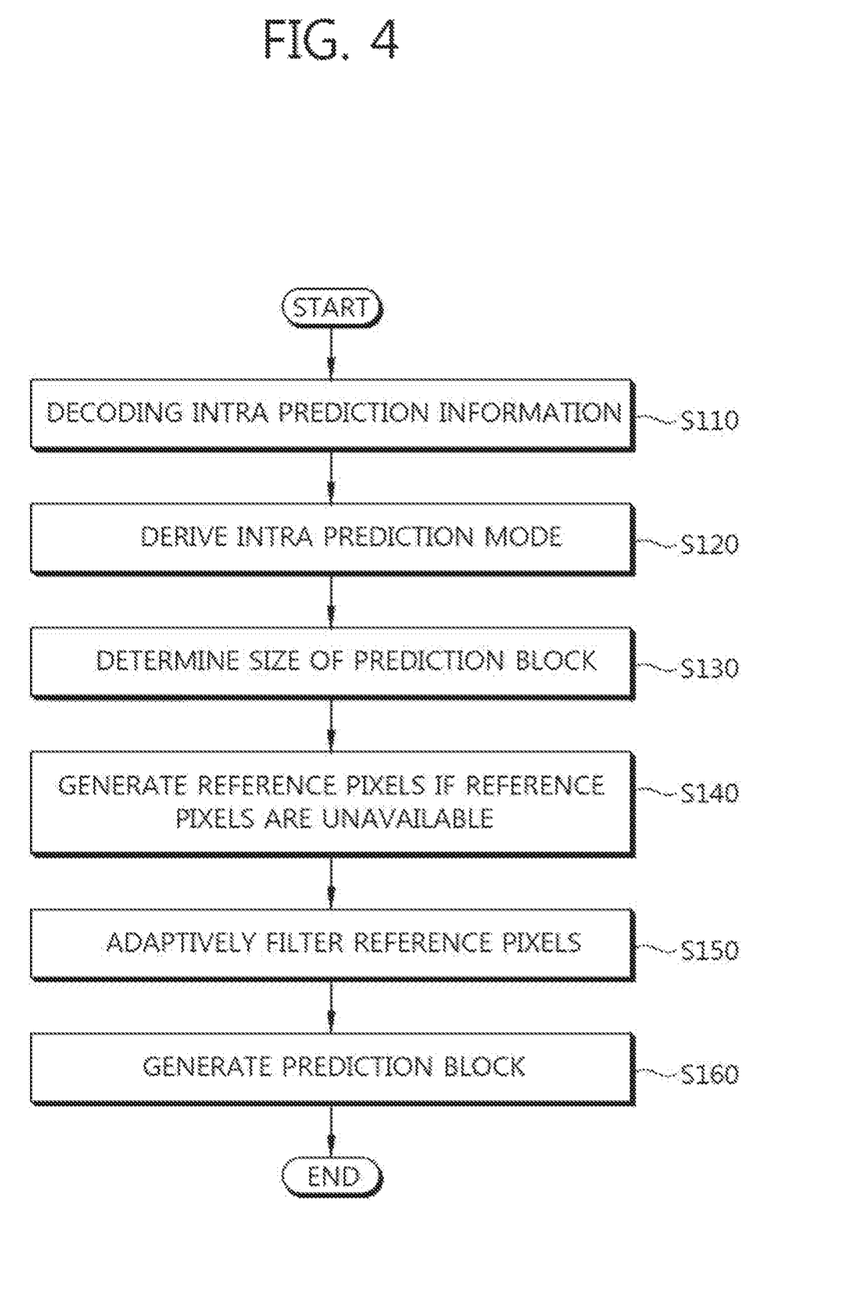
FIG. 4 is a flow chart illustrating a method of generating a prediction block in intra prediction according to the present invention.

FIG. 4 is a flow chart illustrating a method of generating a prediction block in intra prediction according to the present invention.

Intra prediction information of the current prediction unit is entropy-decoded (S110).

The intra prediction information includes a mode group indicator and a prediction mode index. The mode group indicator is a flag indicating whether the intra prediction mode of the current prediction unit belongs to a most probable mode group (MPM group). If the flag is 1, the intra prediction unit of the current prediction unit belongs to the MPM group. If the flag is 0, the intra prediction unit of the current prediction unit belongs to a residual mode group. The residual mode group includes all intra prediction modes other than the intra prediction modes belonging to the MPM group. The prediction mode index specifies the intra prediction mode of the current prediction unit within the group specified by the mode group indicator.

The intra prediction mode of the current prediction unit is derived using the intra prediction information (S120).

Figure 5:
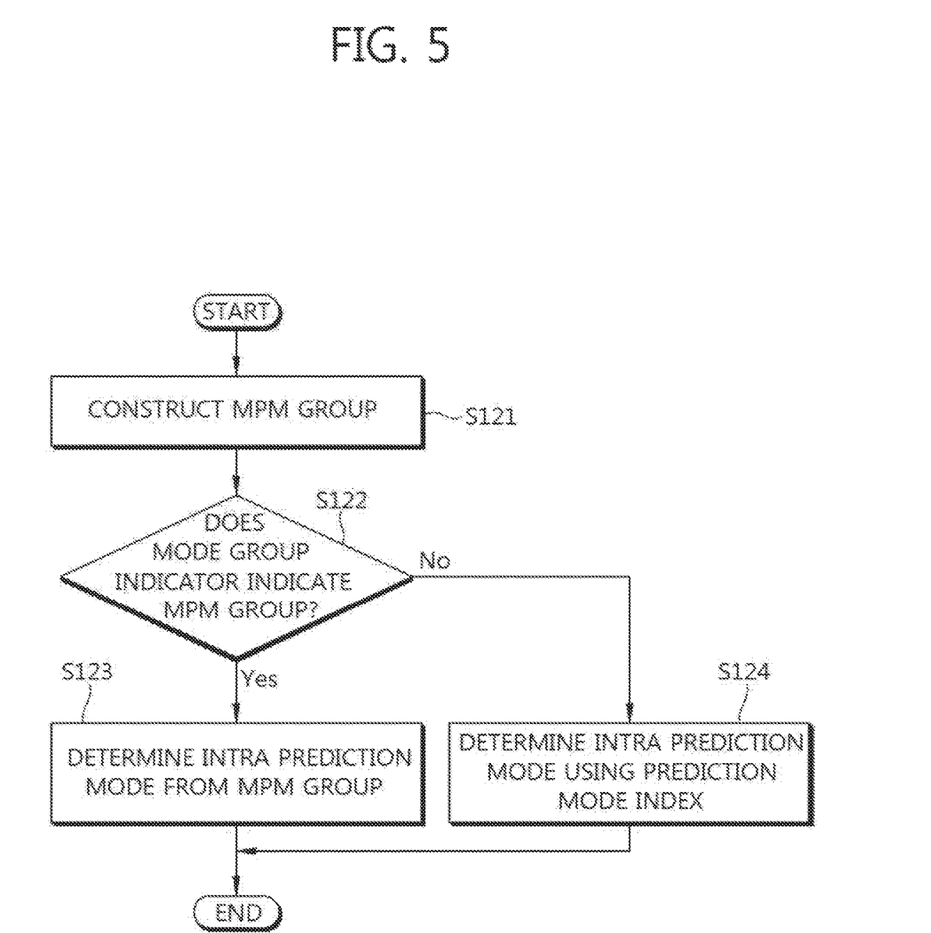
FIG. 5 is a flow chart illustrating a procedure of restoring intra prediction mode according to the present invention.

FIG. 5 is a flow chart illustrating a procedure of deriving intra prediction mode according to the present invention. The intra prediction mode of the current prediction unit is derived using the following ordered steps.

The MPM group is constructed using intra prediction modes of the neighboring prediction units (S121). The intra prediction modes of the MPM group are adaptively determined by a left intra prediction mode and an above intra prediction mode. The left intra prediction mode is the intra prediction mode of the left neighboring prediction unit, and the above intra prediction mode is the intra prediction mode of the above neighboring prediction unit. The MPM group is comprised of three intra prediction modes.

If the left or above neighboring prediction unit does not exist, the intra prediction mode of the left or above neighboring unit is set as unavailable. For example, if the current prediction unit is located at the left or upper boundary of a picture, the left or above neighboring prediction unit does not exist. If the left or above neighboring unit is located within other slice or other tile, the intra prediction mode of the left or above neighboring unit is set as unavailable. If the left or above neighboring unit is inter-coded, the intra prediction mode of the left or above neighboring unit is set as unavailable. If the above neighboring unit is located within other LCU, the intra prediction mode of the left or above neighboring unit may be set as unavailable.

When both of the left intra prediction mode and the above intra prediction mode are available and are different each other, the left intra prediction mode and the above intra prediction mode are included in the MPM group and one additional intra prediction mode is added to the MPM group. Index 0 is assigned to one intra prediction mode of small mode number and index 1 is assigned to the other. Alternatively, index 0 may be assigned to the left intra prediction mode and index 1 may be assigned to the above intra prediction mode. The additional intra prediction mode is determined by the left and above intra prediction modes as follows.

If one of the left and above intra prediction modes is a non-directional mode and the other is a directional mode, the other non-directional mode is added to the MPM group. For example, if the one of the left and above intra prediction modes is the DC mode, the planar mode is added to the MPM group. If the one of the left and above intra prediction modes is the planar mode, the DC mode is added to the MPM group. If both of the left and above intra prediction modes are non-directional modes, the vertical mode is added to the MPM group. If both of the left and above intra prediction modes are directional modes, the DC mode or the planar mode is added to the MPM group.

When only one of the left intra prediction mode and the above intra prediction mode is available, the available intra prediction mode is included in the MPM group and two additional intra prediction modes are added to the MPM group. The added two intra prediction modes are determined by the available intra prediction modes as follows.

If the available intra prediction mode is a non-directional mode, the other non-directional mode and the vertical mode are added to the MPM group. For example, if the available intra prediction mode is the DC mode, the planar mode and the vertical mode are added to the MPM group. If the available intra prediction mode is the planar mode, the DC mode and the vertical mode are added to the MPM group. If the available intra prediction mode is a directional mode, two non-directional modes (DC mode and planar mode) are added to the MPM group.

When both of the left intra prediction mode and the above intra prediction mode are available and are same each other, the available intra prediction mode is included in the MPM group and two additional intra prediction modes are added to the MPM group. The added two intra prediction modes are determined by the available intra prediction modes as follows.

If the available intra prediction mode is a directional mode, two neighboring directional modes are added to the MPM group. For example, if the available intra prediction mode is the mode 23, the left neighboring mode (mode 1) and the right neighboring mode (mode 13) are added to the MPM group. If the available intra prediction mode is the mode 30, the two neighboring modes (mode 2 and mode 16) are added to the MPM group. If the available intra prediction mode is a non-directional mode, the other non-directional mode and the vertical mode are added to the MPM group. For example, if the available intra prediction mode is the DC mode, the planar mode and the vertical mode are added to the MPM group.

When both of the left intra prediction mode and the above intra prediction mode are unavailable, three additional intra prediction modes are added to the MPM group. The three intra prediction modes are the DC mode, the planar mode and the vertical mode. Indexes 0, 1 and 2 are assigned to the three intra prediction modes in the order of the DC mode, the planar mode and the vertical mode or in the order of the planar mode, the DC mode and the vertical mode.

It is determined whether the mode group indicator indicates the MPM group (S122).

If the mode group indicator indicates the MPM group, the intra prediction of the MPM group specified by the prediction mode index is determined as the intra prediction mode of the current prediction unit (S123).

If the mode group indicator does not indicate the MPM group, the intra prediction of the residual mode group specified by the prediction mode index is determined as the intra prediction mode of the current prediction unit (S124). The intra prediction mode of the current unit is derived using the prediction mode index and the intra prediction modes of the MPM group as the following ordered steps.

1) The three intra prediction modes of the MPM group are reordered in the mode number order. The intra prediction mode with lowest mode number is set to a first candidate. The intra prediction mode with middle mode number is set to a second candidate. The intra prediction mode with highest mode number is set to a third candidate.

2) The prediction mode index is compared with the first candidate. If the prediction mode index is equal to or greater than the first candidate of the MPM group, the value of the prediction mode index is increased by one. Otherwise, the value of the prediction mode index is maintained.

3) The prediction mode index is compared with the second candidate. If the prediction mode index is equal to or greater than the second candidate of the MPM group, the value of the prediction mode index is increased by one. Otherwise, the value of the prediction mode index is maintained.

4) The prediction mode index is compared with the third candidate. If the prediction mode index is equal to or greater than the third candidate of the MPM group, the value of the prediction mode index is increased by one. Otherwise, the value of the prediction mode index is maintained.

5) The value of the final prediction mode index is set as the mode number of the intra prediction mode of the current prediction unit.

A size of the prediction block is determined based on the transform size information specifying the size of the transform unit (S130). The transform size information may be one or more split_transform_flags specifying the size of the transform unit.

If the size of the transform unit is equal to the size of the current prediction unit, the size of the prediction block is equal to the size of the current prediction unit.

If the size of the transform unit is smaller than the size of the current prediction unit, the size of the prediction block is equal to the size of the transform unit. In this case, a process of generating a reconstructed block is performed on each sub-block of the current prediction unit. That is, a prediction block and a residual block of a current sub-block are generated and a reconstructed block of each sub-block is generated by adding the prediction block and the residual block. Then, a prediction block, a residual block and a reconstructed block of the next sub-block in decoding order are generated. The restored intra prediction mode is used to generate all prediction blocks of all sub-block. Some pixels of the reconstructed block of the current sub-block are used as reference pixels of the next sub-block. Therefore, it is possible to generate a prediction block which is more similar to the original sub-block.

Next, it is determined whether all reference pixels of the current block are available, and reference pixels are generated if one or more reference pixels are unavailable (S140). The current block is the current prediction unit or the current sub-block. The size of the current block is the size of the transform unit.

Figure 6:
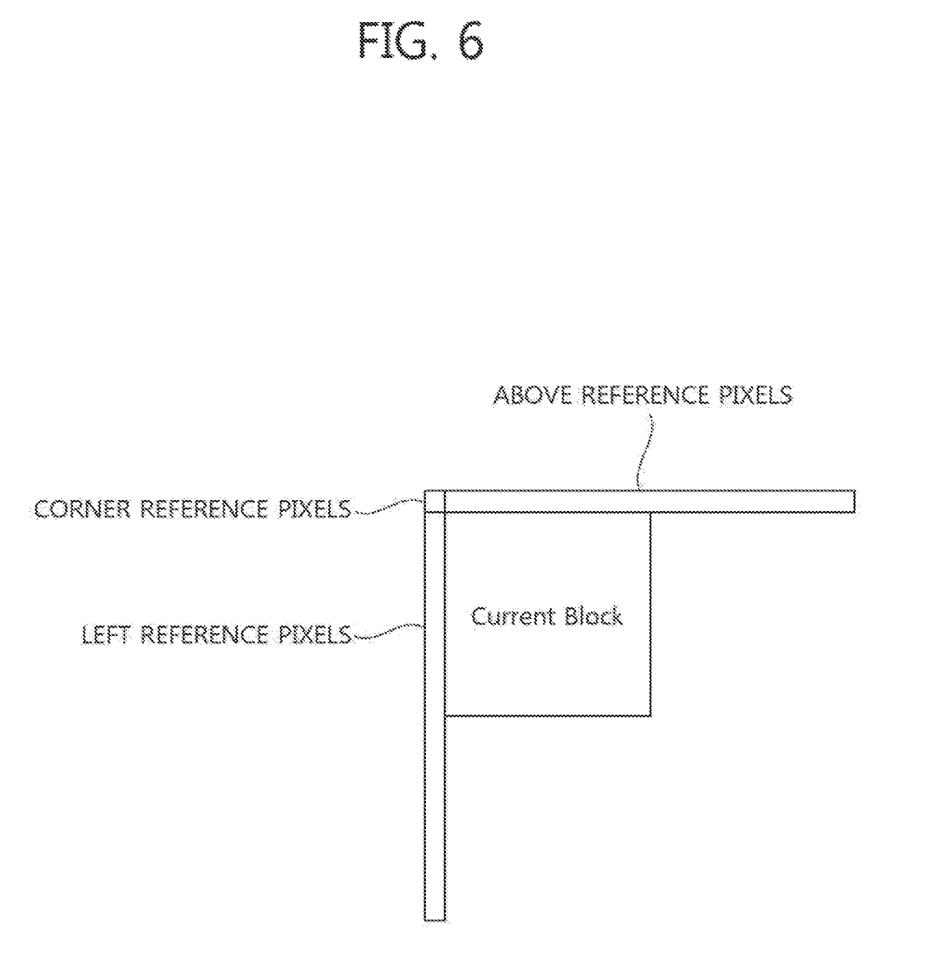
FIG. 6 is a conceptual diagram illustrating positions of reference pixels of a current block according to the present invention.

FIG. 6 is a conceptual diagram illustrating the positions of reference pixels of the current block according to the present invention. As shown in FIG. 6, the reference pixels of the current block are comprised of above reference pixels located at (x=0, . . . , 2N−1, y=−1), left reference pixels located at (x=1−, y=0, . . . , 2M−1) and a corner pixel located at (x=−1, y=−1). N is the width of the current block and M is the height of the current block.

If reconstructed pixels do not exist at corresponding positions or reconstructed pixels are located within another slice, the reference pixels are set as unavailable. In constrained intra prediction mode (CIP mode), the reconstructed pixels of inter mode are also set as unavailable.

If one or more reference pixels are unavailable, one or more reference pixels are generated for the one or more unavailable reference pixels as follows.

If all reference pixels are unavailable, the value of $2^{L-1}$ is substituted for the values of all the reference pixels. The value of L is the number of bits used to represent luminance pixel value.

If available reference pixels are located at only one side of the unavailable reference pixel, the value of the reference pixel nearest to the unavailable pixel is substituted for the unavailable reference pixel.

If available reference pixels are located at both sides of the unavailable reference pixel, the average value of the reference pixels nearest to the unavailable pixel in each side or the value of the reference pixel nearest to the unavailable pixel in a predetermined direction is substituted for each unavailable reference pixel.

Next, the reference pixels are adaptively filtered based on the intra prediction mode and the size of the current block (S150). The size of the current block is the size of the transform unit.

In the DC mode, the reference pixels are not filtered. In the vertical mode and the horizontal mode, the reference pixels are not filtered. In the directional modes other than the vertical and horizontal modes, the reference pixels are adaptively according to the size of the current block.

If the size of the current is 4×4, the reference pixels are not filtered in all intra prediction modes. For the size 8×8, 16×16 and 32×32, the number of intra prediction mode where the reference pixels are filtered increases as the size of the current block becomes larger. For example, the reference pixels are not filtered in the vertical mode and a predetermined number of neighboring intra prediction mode of the vertical mode. The reference pixels are also not filtered in the horizontal mode and the predetermined number of neighboring intra prediction mode of the horizontal mode. The predetermined number lies between 0 to 7 and decreases as the size of the current block is larger.

Next, a prediction block of the current block is generated using the reference pixels according to the restored intra prediction mode (S160).

In the DC mode, the prediction pixels of the prediction block are generated by averaging the N reference pixels located at (x=0, . . . N−1, y=−1) and the M reference pixels located at (x=−1, y=0, . . . M−1). Then, the prediction pixel adjacent to the reference pixel is filtered using one or two adjacent reference pixels.

In the vertical mode, the prediction pixels of the prediction block are generated by copying the value of the corresponding vertical reference pixel. Then, the prediction pixels which are adjacent to the left reference pixel are filtered by the left neighboring reference pixel and the corner pixel.

In the horizontal mode, the prediction pixels of the prediction block are generated by copying the value of the corresponding horizontal reference pixel. Then, the prediction pixels which are adjacent to the above reference pixel are filtered by the above neighboring reference pixel and the corner pixel.

Figure 7:
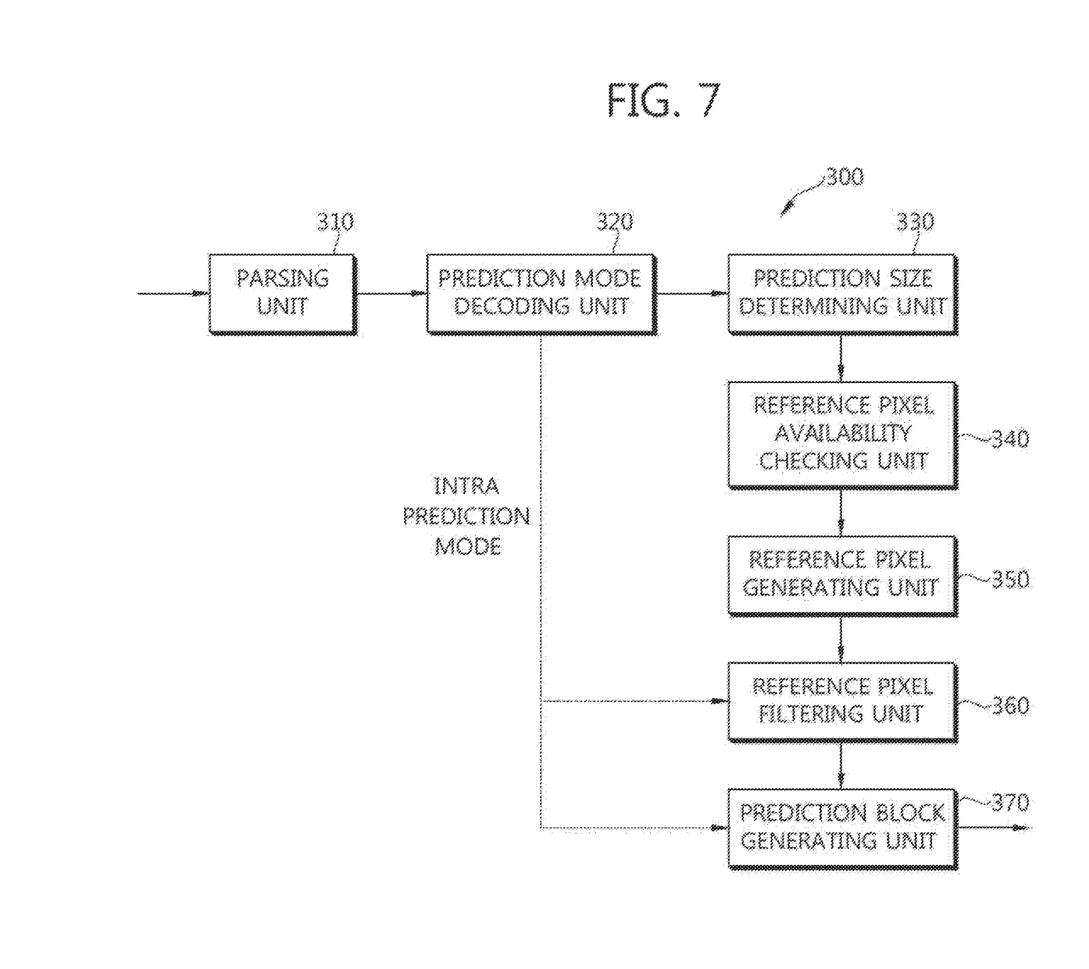
FIG. 7 is a block diagram illustrating an apparatus of generating a prediction block in intra prediction according to the present invention.

FIG. 7 is a block diagram illustrating an apparatus 300 of generating a prediction block in intra prediction according to the present invention.

The apparatus 300 according to the present invention includes a parsing unit 310, a prediction mode decoding unit 320, a prediction size determining unit 330, a reference availability checking unit 340, a reference pixel generating unit 350, a reference pixel filtering unit 360 and a prediction block generating unit 370.

The parsing unit 310 restores the intra prediction information of the current prediction unit from the bit stream.

The intra prediction information includes a mode group indicator and a prediction mode index. The mode group indicator is a flag indicating whether the intra prediction mode of the current prediction unit belongs to a most probable mode group (MPM group). If the flag is 1, the intra prediction unit of the current prediction unit belongs to the MPM group. If the flag is 0, the intra prediction unit of the current prediction unit belongs to a residual mode group. The residual mode group includes all intra prediction modes other than the intra prediction modes belonging to the MPM group. The prediction mode index specifies the intra prediction mode of the current prediction unit within the group specified by the mode group indicator.

The prediction mode decoding unit 320 includes a MPM group constructing unit 321 and a prediction mode restoring unit 322.

The MPM group constructing unit 321 constructs the MPM group of the current prediction unit. The MPM group is constructed using intra prediction modes of the neighboring prediction units. The intra prediction modes of the MPM group are adaptively determined by a left intra prediction mode and an above intra prediction mode. The left intra prediction mode is the intra prediction mode of the left neighboring prediction unit, and the above intra prediction mode is the intra prediction mode of the above neighboring prediction unit. The MPM group is comprised of three intra prediction modes.

The MPM group constructing unit 321 checks the availability of the left intra prediction mode and the above intra prediction mode. If the left or above neighboring prediction unit does not exist, the intra prediction mode of the left or above neighboring unit is set as unavailable. For example, if the current prediction unit is located at the left or upper boundary of a picture, the left or above neighboring prediction unit does not exist. If the left or above neighboring unit is located within other slice or other tile, the intra prediction mode of the left or above neighboring unit is set as unavailable. If the left or above neighboring unit is inter-coded, the intra prediction mode of the left or above neighboring unit is set as unavailable. If the above neighboring unit is located within other LCU, the intra prediction mode of the left or above neighboring unit is set as unavailable.

The MPM group constructing unit 321 constructs the MPM group as follows.

When both of the left intra prediction mode and the above intra prediction mode are available and are different each other, the left intra prediction mode and the above intra prediction mode are included in the MPM group and one additional intra prediction mode is added to the MPM group. Index 0 is assigned to one intra prediction mode of small mode number and index 1 is assigned to the other. Or index 0 is assigned to the left intra prediction mode and index 1 is assigned to the above intra prediction mode. The added intra prediction mode is determined by the left and above intra prediction modes as follows.

If one of the left and above intra prediction modes is a non-directional mode and the other is a directional mode, the other non-directional mode is added to the MPM group. For example, if the one of the left and above intra prediction modes is the DC mode, the planar mode is added to the MPM group. If the one of the left and above intra prediction modes is the planar mode, the DC mode is added to the MPM group. If both of the left and above intra prediction modes are non-directional modes, the vertical mode is added to the MPM group. If both of the left and above intra prediction modes are directional modes, the DC mode or the planar mode is added to the MPM group.

When only one of the left intra prediction mode and the above intra prediction mode is available, the available intra prediction mode is included in the MPM group and two additional intra prediction modes are added to the MPM group. The added two intra prediction modes are determined by the available intra prediction modes as follows.

If the available intra prediction mode is a non-directional mode, the other non-directional mode and the vertical mode are added to the MPM group. For example, if the available intra prediction mode is the DC mode, the planar mode and the vertical mode are added to the MPM group. If the available intra prediction mode is the planar mode, the DC mode and the vertical mode are added to the MPM group. If the available intra prediction mode is a directional mode, two non-directional modes (DC mode and planar mode) are added to the MPM group.

When both of the left intra prediction mode and the above intra prediction mode are available and are same each other, the available intra prediction mode is included in the MPM group and two additional intra prediction modes are added to the MPM group. The added two intra prediction modes are determined by the available intra prediction modes as follows.

If the available intra prediction mode is a directional mode, two neighboring directional modes are added to the MPM group. For example, if the available intra prediction mode is the mode 23, the left neighboring mode (mode 1) and the right neighboring mode (mode 13) are added to the MPM group. If the available intra prediction mode is the mode 30, the two neighboring modes (mode 2 and mode 16) are added to the MPM group. If the available intra prediction mode is a non-directional mode, the other non-directional mode and the vertical mode are added to the MPM group. For example, if the available intra prediction mode is the DC mode, the planar mode and the vertical mode are added to the MPM group.

When both of the left intra prediction mode and the above intra prediction mode are unavailable, three additional intra prediction modes are added to the MPM group. The three intra prediction modes are the DC mode, the planar mode and the vertical mode. Indexes 0, 1 and 2 are assigned to the three intra prediction modes in the order of the DC mode, the planar mode and the vertical mode or in the order of the planar mode, the DC mode and the vertical mode.

The prediction mode restoring unit 322 derives the intra prediction mode of the current prediction unit using the mode group indicator and the prediction mode index as follows.

The prediction mode restoring unit 322 determines whether the mode group indicator indicates the MPM group.

If the mode group indicator indicates the MPM group, the prediction mode restoring unit 322 determines the intra prediction of the MPM group specified by the prediction mode index as the intra prediction mode of the current prediction unit.

If the mode group indicator does not indicate the MPM group, the prediction mode restoring unit 322 determines the intra prediction of the residual mode group specified by the prediction mode index as the intra prediction mode of the current prediction unit. The intra prediction mode of the current unit is derived using the prediction mode index and the intra prediction modes of the MPM group as the following ordered steps.

1) The three intra prediction modes of the MPM group are reordered in the mode number order. The intra prediction mode with lowest mode number is set to a first candidate. The intra prediction mode with middle mode number is set to a second candidate. The intra prediction mode with highest mode number is set to a third candidate.

2) The prediction mode index is compared with the first candidate. If the prediction mode index is equal to or greater than the first candidate of the MPM group, the value of the prediction mode index is increased by one. Otherwise, the value of the prediction mode index is maintained.

3) The prediction mode index is compared with the second candidate. If the prediction mode index is equal to or greater than the second candidate of the MPM group, the value of the prediction mode index is increased by one. Otherwise, the value of the prediction mode index is maintained.

4) The prediction mode index is compared with the third candidate. If the prediction mode index is equal to or greater than the third candidate of the MPM group, the value of the prediction mode index is increased by one. Otherwise, the value of the prediction mode index is maintained.

5) The value of the final prediction mode index is set as the mode number of the intra prediction mode of the current prediction unit.

The prediction size determining unit 330 determines the size of the prediction block based on the transform size information specifying the size of the transform unit. The transform size information may be one or more split_transform_flags specifying the size of the transform unit.

If the size of the transform unit is equal to the size of the current prediction unit, the size of the prediction block is equal to the size of the current prediction unit.

If the size of the transform unit is smaller than the size of the current prediction unit, the size of the prediction block is equal to the size of the transform unit. In this case, a process of generating a reconstructed block is performed on each sub-block of the current prediction unit. That is, a prediction block and a residual block of a current sub-block are generated and a reconstructed block of each sub-block is generated by adding the prediction block and the residual block. Then, a prediction block, a residual block and a reconstructed block of the next sub-block in decoding order are generated. The restored intra prediction mode is used to generate all prediction blocks of all sub-block. Some pixels of the reconstructed block of the current sub-block are used as reference pixels of the next sub-block. Therefore, it is possible to generate a prediction block which is more similar to the original sub-block.

The reference pixel availability checking unit 340 determines whether all reference pixels of the current block are available. The current block is the current prediction unit or the current sub-block. The size of the current block is the size of the transform unit.

The reference pixel generating unit 350 generates reference pixels if one or more reference pixels of the current block are unavailable.

If all reference pixels are unavailable, the value of $2^{L-1}$ is substituted for the values of all the reference pixels. The value of L is the number of bits used to represent luminance pixel value.

If available reference pixels are located at only one side of the unavailable reference pixel, the value of the reference pixel nearest to the unavailable pixel is substituted for the unavailable reference pixel.

If available reference pixels are located at both sides of the unavailable reference pixel, the average value of the reference pixels nearest to the unavailable pixel in each side or the value of the reference pixel nearest to the unavailable pixel in a predetermined direction is substituted for each unavailable reference pixel.

The reference pixel filtering unit 360 adaptively filters the reference pixels based on the intra prediction mode and the size of the current block.

In the DC mode, the reference pixels are not filtered. In the vertical mode and the horizontal mode, the reference pixels are not filtered. In the directional modes other than the vertical and horizontal modes, the reference pixels are adaptively according to the size of the current block.

If the size of the current is 4×4, the reference pixels are not filtered in all intra prediction modes. For the size 8×8, 16×16 and 32×32, the number of intra prediction mode where the reference pixels are filtered increases as the size of the current block becomes larger. For example, the reference pixels are not filtered in the vertical mode and a predetermined number of neighboring intra prediction mode of the vertical mode. The reference pixels are also not filtered in the horizontal mode and the predetermined number of neighboring intra prediction mode of the horizontal mode. The predetermined number lies between 0 to 7 and decreases as the size of the current block is larger.

The prediction block generating unit 370 generates a prediction block of the current block using the reference pixels according to the restored intra prediction mode.

In the DC mode, the prediction pixel of the prediction block which is not adjacent to the reference pixel is generated by averaging the N reference pixels located at (x=0, . . . N−1, y=−1) and the M reference pixels located at (x=−1, y=0, . . . M−1). The prediction pixel adjacent to the reference pixel is generated using the average value and one or two adjacent reference pixels.

In the vertical mode, the prediction pixels which are not adjacent to the left reference pixel are generated by copying the value of the vertical reference pixel. The prediction pixels which are adjacent to the left reference pixel are generated by the vertical reference pixel and variance between the corner pixel and the left neighboring pixel.

In the horizontal mode, the prediction pixels are generated using the same method.

While the invention has been shown and described with reference to certain exemplary embodiments thereof, it will be understood by those skilled in the art that various changes in form and details may be made therein without departing from the spirit and scope of the invention as defined by the appended claims.

What is claimed is:
1. An image encoding apparatus comprising:
an intra predictor to determine an intra prediction mode of a current prediction unit and generate a prediction block using the intra prediction mode;
an inter predictor to determine motion information and generate a prediction block;

a transformer to transform residual signals generated by using an original block and the prediction block to generate a transformed block;

a quantizer to determine a quantization parameter and quantize the transformed block using a quantization matrix and the quantization parameter to generate a quantized block;

a scanner to determine a scan pattern and apply the scan pattern to significant coefficients, sign flags and levels of the quantized block;

an entropy coder to entropy-code one-dimensional coefficient information received from the scanner, intra prediction information received from the intra predictor, and motion information received from the inter predictor;

an inverse quantizer to inversely quantize the quantized block;

an inverse transformer to inversely transform the inversely quantized block to generate a residual block;

an adder to generate a reconstructed block by adding the residual block and the prediction block; and a post-processor to remove blocking artifact in a reconstructed picture, wherein a differential quantization parameter is generated by subtracting a quantization parameter predictor from the quantization parameter, and is entropy-coded, wherein, if two or more quantization parameters are available among a left quantization parameter, an above quantization parameter and a previous quantization parameter of a current coding unit, the quantization parameter predictor is generated using two available quantization parameters determined according a predetermined order among the left quantization parameter, the above quantization parameter and the previous quantization parameter, if the left quantization parameter is not available among the left quantization parameter, the above quantization parameter and the previous quantization parameter, an average of the above quantization parameter and the previous quantization parameter is set as the quantization parameter predictor, and if only one quantization parameter is available among the left quantization parameter, the above quantization parameter and the previous quantization parameter, the available quantization parameter is set as the quantization parameter predictor, and wherein a transform type for inversely transforming the residual signals is selected among a discrete cosine transform (DCT)-based integer transform and a discrete sine transform (DST)-based integer transform based on a prediction mode and a size of a transform unit.

2. The apparatus of claim 1, wherein a size of the prediction block generated by the intra predictor is equal to a size of a transform unit, and plural prediction blocks are generated by the intra predictor using the intra prediction mode if a size of the current prediction unit is larger than the size of the transform unit.

3. The apparatus of claim 1, wherein if the left and above quantization parameters are available, an average of the left and above quantization parameters is set as the quantization parameter predictor.

4. The apparatus of claim 1, wherein the quantization parameter is generated per quantization unit, and a minimum size of the quantization unit is adjusted per picture.

5. The apparatus of claim 1, wherein the quantizer has a size of a coding unit equal to or larger than a reference size, and the reference size is a minimum size of a quantization unit.

6. The apparatus of claim 5, wherein the minimum size of the quantization unit is one of allowable sizes of the coding unit.

7. The apparatus of claim 1, wherein the scan pattern is determined by the intra prediction mode and the size of the transform unit in intra prediction.

8. The apparatus of claim 7, wherein if the size of the transform unit is larger than 4×4, the quantized block is divided into a plurality of subsets, the scan pattern is applied to the plurality of subsets, and non-zero subset flags are determined and encoded.

9. The apparatus of claim 8, wherein the non-zero subset flag indicates whether the subset contains non-zero coefficients or not.

* * * * *